US008565243B2

(12) United States Patent
Little (10) Patent No.: US 8,565,243 B2
(45) Date of Patent: Oct. 22, 2013

(54) METHOD AND APPARATUS FOR USING A GOSSIP PROTOCOL TO COMMUNICATE ACROSS NETWORK PARTITIONS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 234 days.

(21) Appl. No.: 12/955,847

(22) Filed: Nov. 29, 2010

(65) Prior Publication Data

US 2012/0134363 A1    May 31, 2012

(51) Int. Cl.
*H04L 12/56* (2011.01)

(52) U.S. Cl.
USPC .......................................................... 370/400

(58) Field of Classification Search
USPC .................. 370/216, 225, 241, 242, 250, 400
See application file for complete search history.

(56) References Cited

U.S. PATENT DOCUMENTS

| 7,310,688 B1* | 12/2007 | Chin ............................ 709/252 |
| 2011/0119328 A1* | 5/2011 | Simitci et al. ................. 709/203 |
| 2012/0020207 A1* | 1/2012 | Corti et al. .................... 370/225 |

OTHER PUBLICATIONS

Beyer et al., "Implementing Network Partition-Aware Fault-Tolerant CORBA Systems" Apr. 10-13, 2007, 8 pages, The Second International Conference on Availability, Reliability and Security, ARES 2007.
Bouwmeester, Leon, "Using Atomic Actions in Replica Groups to Simplify the Replication Implementation" Nov. 1993, 12 pages, Intelligent Networked Computing Laboratory, HP Laboratories Bristol, Hewlett-Packard Company.
Eugster, et al., "Epidemic Information Dissemination in Distributed Systems" 2004, p. 60-67, School of Computer & Community Science, Swiss Federal Institute of Technology, Lausanne, Switzerland.
Golding, Richard Andrew, "Weak-consistency group communication and membership" Dec. 1992, 165 pages, University of California Santa Cruz.
Jelasity, et al., "Gossip-Based Aggregation in Large Dynamic Networks" Aug. 2005, pp. 219-252, ACM Transactions on Computer Systems, vol. 23, No. 3.
Kempe, David, "Spatial Gossip and Resource Location Protocols" 2001, 22 pages, Proceedings of the thirty-third annual ACM symposium on Theory of computing, New York.
Leitão, et al., "HyParView: a membership protocol for reliable gossip-based broadcast" May 2007, 17 pages, Departamento de Informática, Faculdade de Ciências da Universidade de Lisboa, Campo Grande, Lisboa, Portugal.
Morgan, et al., "Policies for using Replica Groups and their effectiveness over the Internet" 2000, 11 pages, Proc. 2nd International COST264 Workshop on Networked Group Communication.

(Continued)

*Primary Examiner* — Dang Ton
*Assistant Examiner* — Kevin Lee
(74) *Attorney, Agent, or Firm* — Lowenstein Sandler LLP (57) ABSTRACT

A computing device sends a message to a destination node. Upon failing to receive a message response from the destination node, the computing device sends a query to a plurality of additional nodes, wherein the query causes the additional nodes to attempt to communicate with the destination node and to forward the query to other additional nodes if the attempt to communicate with the destination node fails. Further, the computing device receives a query response from an additional node of the plurality of additional nodes, the query response indicating that the additional node can communicate with the destination node, and uses the additional node as a proxy for communicating with the destination node.

17 Claims, 8 Drawing Sheets

(56) References Cited

OTHER PUBLICATIONS

Wokoma, et al., "A Weakly Coupled Adaptive Gossip protocol for Application Level Active Networks" 2002, Policy '02 Proceedings of the 3rd International Workshop on Policies for Distributed Systems.

Birman, Kenneth P., "Replication and Fault-Tolerance in the Isis System" 1985, pp. 79-86, Association for Computing Machinery.

Little, Mark C., et al., "Replicated K—Resilient Objects in Arjuna" Nov. 1990, 13 pages, Proceedings of the First IEEE Workshop on Replicated Data, Houston.

Mishra, Shrivakant, et al., "Implementing Fault-Tolerance Replicate" 1989, 1 page, IEEE.

Saito, Yasushi, et al., "Optimistic Replication" 1995, 44 pages, ACM Computing Surveys, vol. 5, No. N.

\* cited by examiner

METHOD AND APPARATUS FOR USING A GOSSIP PROTOCOL TO COMMUNICATE ACROSS NETWORK PARTITIONS

TECHNICAL FIELD

Embodiments of the present invention relate to network architectures, and more specifically to communicating across network partitions.

BACKGROUND

Network architectures include multiple services and/or applications that operate on different machines (computing devices) that are connected via a network. Some services or applications may rely on other services and/or applications to operate. However, machines, and services and applications that operate on the machines, may occasionally become unavailable (e.g., when a machine loses power, an application crashes, a network connection to the machine is lost, etc.).

Conventional network architectures can determine whether a machine or a service operating on a machine is unreachable (cannot be communicated with). However, conventional network architectures cannot distinguish between a network failure (e.g., a network partition) or a failure of the machine or service. Nor do conventional network architectures enable machines and services to communicate with one another across network partitions.

BRIEF DESCRIPTION OF THE DRAWINGS

The present invention is illustrated by way of example, and not by way of limitation, in the figures of the accompanying drawings and in which.

DETAILED DESCRIPTION

Described herein are a method and apparatus for using a gossip communication protocol to communicate across network partitions. In one embodiment, a computing device sends a message to a destination node. Upon failing to receive a message response from the destination node, the computing device sends a query to additional nodes. The query may be sent using a gossip communication protocol. The query causes the additional nodes to attempt to communicate with the destination node, and to send the query to other additional nodes if they are unable to communicate with the destination node. The computing device then receives a query response from at least one of the additional nodes. The query response indicates that the additional node can communicate with the destination node. The computing device thereafter uses the additional node as a proxy for communicating with the destination node. Therefore, the computing device sends messages to the additional node, which the additional node forwards to the destination node. Additionally, the computing device may receive messages from the additional node that originated at the destination node.

Embodiments of the present invention enable clients, servers and services to communicate with one another in spite of network failures that result in network partitions. Accordingly, the occurrence of network partitions may not interrupt communication between such clients, servers and services in embodiments of the present invention. This may increase robustness of the network.

Figure 1:
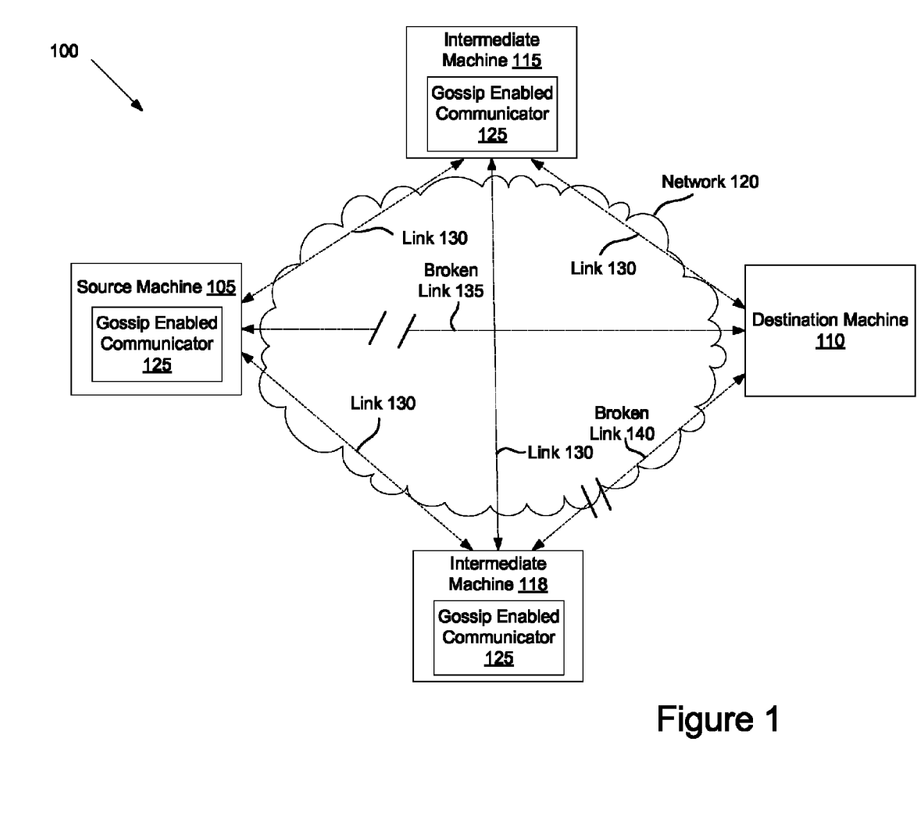
FIG. 1 illustrates an exemplary network architecture, in which embodiments of the present invention may operate.

FIG. 1 illustrates an exemplary network architecture 100, in which embodiments of the present invention may operate. In one embodiment, the network architecture 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The network architecture 100 includes multiple machines (e.g., source machine 105, intermediate machines 115, 118 and destination machine 110) connected via a network 120. The network 120 may be a public network (e.g., Internet), a private network (e.g., Ethernet or a local area Network (LAN)), or a combination thereof. Machines 105, 110, 115, 118 may be desktop computers, laptop computers, servers, or other computing devices. Additionally, machines 105, 110, 115, 118 may also be routers, switches, gateways, or other network devices. Each of the machines 105, 110, 115, 118 may include an operating system that manages an allocation of resources of the machine (e.g., by allocating memory, prioritizing system requests, controlling input and output devices, managing file systems, facilitating networking, etc.). Each of the machines 105, 110, 115, 118 may additionally include client and/or server software that runs on the operating system. Client software may be an application that runs on a machine, and that accesses services. Each of the machines 105, 110, 115, 118 may also include one or more services that run on the operating system and/or on server software. A service is a discretely defined set of contiguous and autonomous functionality (e.g., business functionality, technical functionality, etc.). A service may represent a process, activity or other resource that can be accessed and used by other services or clients on network 120.

Under typical conditions, each machine 105, 110, 115, 118 can communicate with each other machine via the network 120. Links 130 show that machines can communicate with other machines via network 120. However, on occasion a portion of the network 120 may become inoperative. The network includes a collection of routers, switches, gateways, servers, and other devices (not shown) that enable communication between the various machines. When one or more of these routers, switches, or other devices becomes inoperative, a network partition may occur. A network partition is a condition in which all of the network connections between any two groups of systems fail. When a network partition occurs, systems on one side of the network partition cannot communicate with systems on the other side of the network partition. In network architecture 100, a broken link 135 is shown between source machine 105 and destination machine 110, and a broken link 140 is shown between intermediate machine 118 and destination machine 110. The broken links 135, 140 represent a network partition that prevents source machine 105 and intermediate machine 118 from communicating with destination machine 110.

In conventional systems, source machine 105 would be unable to communicate with destination machine 110 until the network partition was fixed. However, such a network partition does not necessarily prevent other machines (e.g., intermediate machine 115) from communicating with the source machine 105 and/or the destination machine 110. Embodiments of the present invention take advantage of this fact to enable the source machine 105 to communicate with the destination machine 110 across the network partition using a gossip communication protocol.

A gossip communication protocol is a communication protocol that enables a single node (e.g., a source machine 105) to communicate with a large number of additional nodes (e.g., intermediate machines 115, 118 and destination machine 110) without directly sending messages to each of those additional nodes. In a gossip communication protocol, the source node broadcasts or multicasts the message to a group of additional nodes. Upon receiving the message, each of the additional nodes in turn sends the message to further nodes, which in turn send the message to still more nodes. Gossip communication protocols are resilient, and distribute load among the multiple nodes of the system. In embodiments of the present invention, existing gossip communication protocols may be used, or a new gossip communication protocol that performs the functions described herein may be used. Examples of gossip communication protocols include NeighborCast and HyParView.

In one embodiment, the source machine 105 and intermediate machines 115, 118 each include a gossip enabled communicator 125 that communicates with other machines using a gossip communication protocol. When a machine (e.g., source machine 105) attempts and fails to communicate with another machine (e.g., destination machine 110), the gossip enabled communicator 125 generates queries and broadcasts or multicasts the queries to additional machines (e.g., intermediate machines 115, 118). The query asks the additional machines whether they are able to communicate with the destination machine. Each of the additional machines attempts to communicate with the destination machine upon receiving the query. If an intermediate machine cannot communicate with the destination machine, it broadcasts or multicasts the query to other additional machines (not shown). If an intermediate machine can communicate with the destination machine, it reports this ability back to the source machine. The source machine then uses that intermediate machine as a proxy for communicating with the destination machine. For example, in network architecture 100, intermediate machine 115 can communicate with destination machine 110. Accordingly, intermediate machine 115 may act as a proxy for communications between source machine 105 and destination machine 110. Thus, if any intermediate machine (e.g., intermediate machine 115) is able to communicate with the destination machine 110, then source machine 105 is also able to communicate with the destination machine 110 via that intermediate machine.

Figure 2:
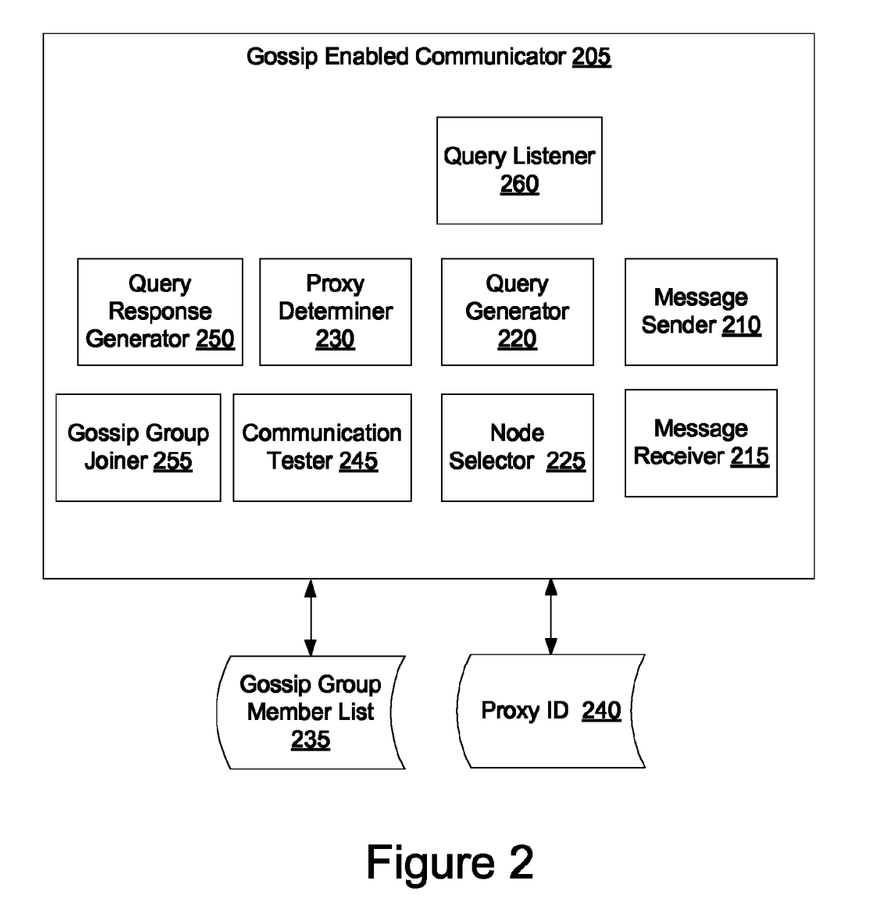
FIG. 2 illustrates a block diagram of a gossip enabled communicator, in accordance with one embodiment of the present invention.

FIG. 2 illustrates a block diagram of a gossip enabled communicator 205, in accordance with one embodiment of the present invention. In one embodiment, the gossip enabled communicator 205 corresponds to gossip enabled communicators 125 of FIG. 1. The gossip enabled communicator 205 may be installed on each machine that will participate in a gossip communication group.

In one embodiment, the gossip enabled communicator 205 includes a gossip group joiner 255 that joins a gossip communication group for the gossip enabled communicator 205. The gossip group joiner 255 may join one of multiple available gossip communication groups, or there may be only a single gossip communication group that the gossip group joiner 255 can join. In one embodiment, the gossip group joiner 255 queries a server to determine available gossip communication groups. The gossip group joiner 255 may receive a list of available gossip communication groups. The list may identify the number of members in each group, geographic regions of members, and/or additional information. The gossip group joiner 255 may then join one of the available gossip communication groups.

Once the gossip group joiner 255 joins a gossip communication group, the gossip group joiner 255 receives a gossip group member list 235. The gossip group member list 235 may include every member of the gossip communication group, which gives the gossip enabled communicator 205 a full view of the gossip group. Alternatively, the gossip group member list 235 may include a subset of the total membership, which provides a partial view of the gossip group. Each entry in the gossip group member list 235 includes an address of a particular group member. In one embodiment, the address includes an internet protocol (IP) address and a port number. For example, the address may be a tuple (IP address, port number) that enables the gossip enabled communicator to communicate with the group member. In one embodiment, the gossip group joiner 255 periodically obtains an updated gossip group member list to maintain a full or partial membership view in light of dynamic changes to the gossip communication group (e.g., as new members are added, and existing members go offline). Note that if the gossip group member list 235 includes a partial view of the group membership, then different gossip enabled communicators 205 in the group would have different member lists 235.

In one embodiment, the gossip enabled communicator 205 includes a message sender 210 and a message receiver 215. When an application (e.g., a client or service) needs to communicate with a destination node, the message sender 210 sends a message to that destination node for the application. If the network and destination node are functioning properly, the message receiver 215 would then receive a message from the destination node, which the message receiver 215 would then forward to the application that generated the original message. However, if there is a network partition that prevents communication with the destination node, no message response will be received from the destination node.

When no message response is received from the destination node in a predetermined time period (e.g., 100 ms, 2 seconds, 5 seconds, etc.), query generator 220 generates a query. In one embodiment, message sender 210 attempts to resend the message before query generator 220 generates the query. Message sender 210 may resend the message a predetermined number of times before query generator 220 creates the query.

The query is a message that causes other nodes that include a gossip enabled communicator 205 to attempt to communicate with the destination node. The query may be a simple message that includes an address of the destination node and an address of the source node that generated the query. When an intermediate node receives the query, that node may use the included destination node address to send an "are you alive" or ping message to the destination node. The intermediate node may then use the source node's address to report an ability to communicate with the destination node to the source node.

Once the query is generated, node selector 225 selects multiple intermediate nodes from the group member list 235 to send the query to. The node selector 225 may select a subset of the member (entries) in the gossip group member list, or may select all members in the gossip group member list. In one embodiment, the selection is performed randomly. Alternatively, the selection may be performed in a deterministic manner. For example, intermediate nodes may be selected sequentially using a round robin technique. The message sender 210 then sends the query to each of the selected intermediate nodes. Each of these intermediate nodes will attempt to communicate with the destination node upon receiving the query. Those intermediate nodes that cannot communicate with the destination node will send the query on to more intermediate nodes, which in turn may send the query to still more intermediate nodes, and so on.

If the message receiver 215 fails to receive query responses from any intermediate nodes (group members), then node selector 225 may select additional nodes from the gossip group member list 235, and message sender 210 may send the query to the additional nodes. Alternatively, gossip enabled communicator 205 may determine that the destination node is unreachable (e.g., that the destination node has crashed or that the network is down). Once message receiver 215 receives a query response indicating that an intermediate node was able to communicate with the destination node, proxy determiner 230 designates that intermediate node as a proxy. Note that the intermediate node from which the query response is received may not be an intermediate node to which the message sender 210 sent a query. Instead, the query may have been forwarded to the intermediate node from which the query response was received by some other intermediate node. In one embodiment, proxy determiner 230 generates a proxy identifier (ID) that includes the address of the intermediate node that will operate as the proxy.

In some instances, message receiver 215 may receive query responses from multiple intermediate nodes that were able to successfully communicate with the destination node. In such an instance, proxy determiner 230 selects one of the intermediate nodes to designate as proxy. In one embodiment, proxy determiner 230 selects an intermediate node to act as proxy based on bandwidth and/or lag between the source node and the intermediate node. The received query response may include a bandwidth and/or response time (e.g., lag) between the intermediate node and the destination node and/or between the source node and the intermediate node. The proxy determiner 230 may select a proxy that has a lowest overall lag for round trip messages through the intermediate node, to the destination node, and back to the current node. For example, if delivery time for messages sent to the destination node via a first intermediate node is 1 second and delivery time for messages sent to the destination node via a second intermediate node is 2 seconds, then the proxy determiner 230 may select the first node to act as proxy.

Once a proxy has been designated, message sender 210 sends messages to the proxy along with requests for those messages to be forwarded on to the destination node. Message receiver 215 receives messages from the proxy that were generated by the destination node. Thus, the gossip enabled communicator 205 is able to communicate with the destination node across a network partition.

Gossip enabled communicator 205 includes a query listener 260. Query listener 260 listens for queries generated by other members of the gossip communication group. When message receiver 215 receives such a query, query listener 260 reports the query to communication tester 245.

Upon receiving a query, communication tester 245 attempts to communicate with a destination node identified in the received query. In one embodiment, communication tester 245 sends a ping message to the destination node. If a response to the ping message is received from the destination node, then communication tester 245 determines that gossip enabled communicator 205 can communicate with the destination node. If no ping response is received, then gossip enabled communicator 205 may determine that gossip enabled communicator 205 cannot communicate with the destination node.

If the gossip enabled communicator 205 is able to communicate with the destination node, query response generator 250 generates a query response, and message sender 210 sends the query response to the source node that originated the query. The query response notifies the source node that the gossip enabled communicator 205 is able to communicate with the destination node. The query response includes an address (e.g., IP address and port number) of the current node on which the gossip enabled communicator 205 resides. The source node may then send messages to the gossip enabled communicator 205, and message sender 210 may forward those messages to the destination node.

If the current node cannot communicate with the destination node, then the query generator 220 may generate a query, the node selector 225 may select members to send the query to, and the message sender 210 may send the query to those selected members. Alternatively, a received query may be sent to the selected members without generating a new query.

Each node (e.g., group member) that receives a query attempts to communicate with the destination node, and sends the query on to additional nodes if the node cannot communicate with the destination node. Accordingly, queries may eventually be sent to all members of the gossip group.

Figure 3:
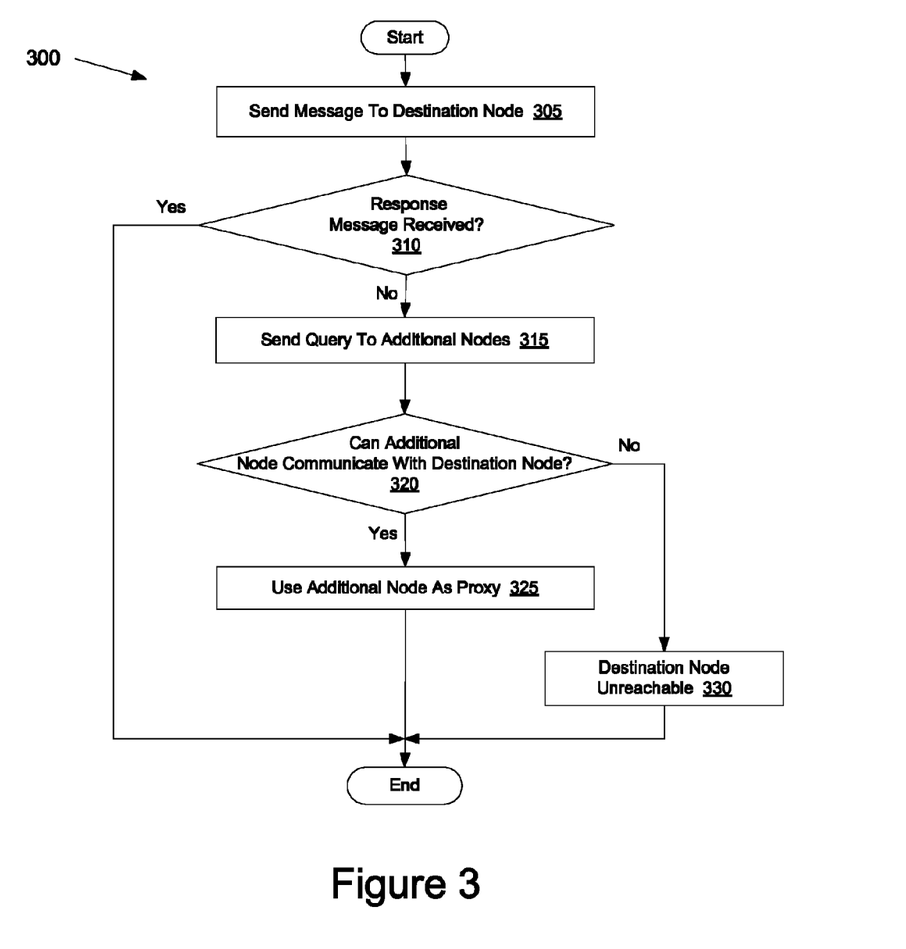
FIG. 3 illustrates a flow diagram of one embodiment for a method of using a gossip protocol to communicate across a network partition by a source node.

FIG. 3 illustrates a flow diagram of one embodiment for a method 300 of using a gossip protocol to communicate across a network partition by a source node. The method may be performed by processing logic that may comprise hardware (e.g., circuitry, dedicated logic, programmable logic, microcode, etc.), software (such as instructions run on a processing device), or a combination thereof. In one embodiment, method 300 is performed by a source machine that includes a gossip enabled communicator 125, as shown in FIG. 1.

Referring to FIG. 3, at block 305 processing logic sends a message to a destination node. For example, a client may send a service request message to a service running on a remote machine. At block 310, processing logic determines whether a response message has been received within a predetermined time. If a response message is received within the predetermined time, then the method ends. If no response message is received within the predetermined time, then the method proceeds to block 315. In one embodiment, the initial message is resent to the destination node a predetermined number of times before the method proceeds to block 315. If a message response is received after resending the initial message, the method ends.

At block 315, processing logic generates a query and sends the query to multiple additional nodes. The query causes the additional nodes to attempt to communicate with the destination node. Additionally, the query is sent using a gossip communication protocol. The gossip communication protocol causes the query to be sent to other additional nodes if certain criteria are satisfied. In one embodiment, the gossip communication protocol causes a node to send the query to other additional nodes if that node is unable to successfully communicate with the destination node.

At block 320, processing logic determines whether any of the additional nodes can communicate with the destination node. In one embodiment, a query response is received from an additional node if that additional node can communicate with the destination node. Alternatively, query responses may be received from additional nodes regardless of whether those additional nodes can communicate with the destination node. In such an embodiment, each of the query responses includes a communication success or a communication failure indicator. If an additional node can communicate with the destination node, the method proceeds to block 325. Otherwise, the method continues to block 330, and processing logic determines that the destination node is unreachable.

At block 325, processing logic uses the additional node from which the query response was received as a proxy for communicating with the destination node. This may include sending messages to the additional node, which the additional node forwards to the destination node, and/or receiving messages from the additional node that the additional node receives from the destination node. In some instances, the network partition may only interrupt communications in one direction. When this occurs, the intermediate node may act as proxy only for communications travelling in one direction. For example, the intermediate node may act as a proxy for messages sent from the source node to the destination node, but the destination node may send message responses directly to the source node. Alternatively, the intermediate node may act as proxy for message responses sent from the destination node to the source node, but source node may send messages directly to the destination node.

Figure 4:
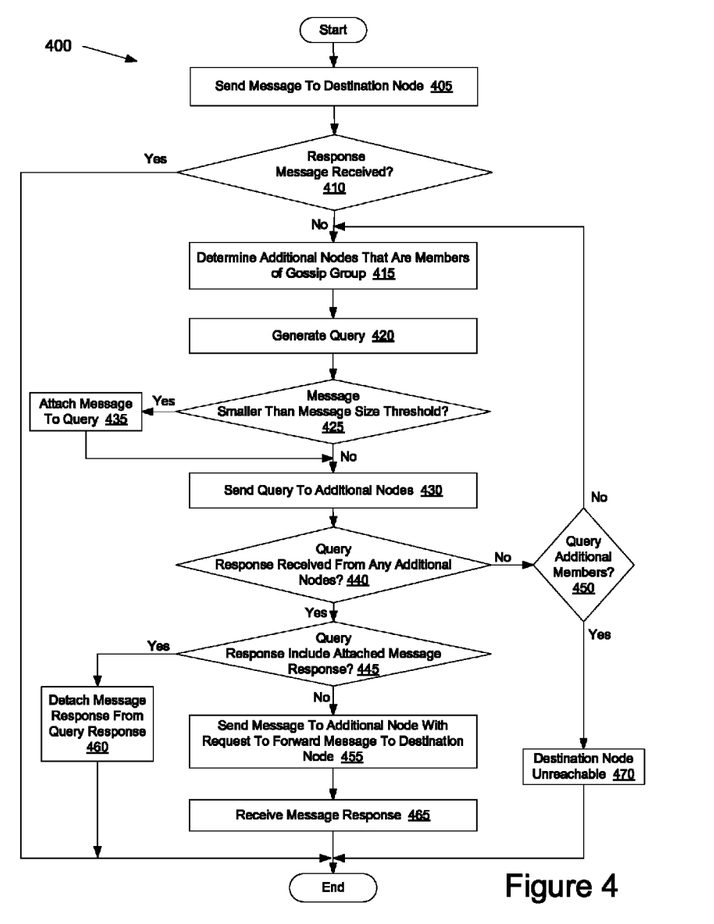
FIG. 4 illustrates a flow diagram of another embodiment for a method of using a gossip protocol to communicate across a network partition by a source node.

FIG. 4 illustrates a flow diagram of another embodiment for a method 400 of using a gossip protocol to communicate across a network partition by a source node. The method may be performed by processing logic that may comprise hardware (e.g., circuitry, dedicated logic, programmable logic, microcode, etc.), software (such as instructions run on a processing device), or a combination thereof. In one embodiment, method 400 is performed by a source machine (source node) that includes a gossip enabled communicator 125, as shown in FIG. 1.

Referring to FIG. 4, at block 405 processing logic sends a message to a destination node. At block 410, processing logic determines whether a response message has been received within a predetermined time and/or if a predetermined number of message resend attempts have failed. If a response message is received, then the method ends. If no response message is received, then the method proceeds to block 415.

At block 415, processing logic determines additional nodes that are members of a gossip communication group that the source node belongs to. The determined additional nodes may be a subset of the gossip communication group. Alternatively, the additional nodes may include all members of the gossip communication group.

At block 420, processing logic generates a query, which asks whether a recipient is able to communicate with the destination node. At block 425, processing logic determines whether the initial message is smaller than a message size threshold. If the initial message is smaller than the message size threshold, then the method continues to block 435. At block 435, processing logic attaches the initial message to the query, after which the method proceeds to block 430. Additionally, processing logic may also modify the query to include instructions to forward the initial message to the destination node at block 435. Such instructions may cause an intermediate node to send the initial message to the destination node if the intermediate node successfully communicates with the destination node. Since the initial message is below the message size threshold, the initial message can be attached to the query without taking up a significantly larger amount of network bandwidth. This has the added benefit of reducing the number of round trip messages that will be used to ultimately transmit the initial message to the destination node and/or to receive a message response from the destination node. If the initial message is not smaller than the message size threshold, the method continues to block 430.

At block 430, processing logic sends the query to the additional nodes. The query may be sent using, for example, using a gossip communication protocol that employs transmission control protocol/internet protocol (TCP/IP). In one embodiment, the query is sent to the additional nodes using a multicast transmission technique. Alternatively, the query is sent to the additional nodes using a broadcast transmission technique. At block 440, processing logic determines whether a query response has been received from any additional nodes. Note that each of the additional nodes that receives the query may in turn forward the query on to other additional nodes, which in turn may forward the query to still further additional nodes. Any of these nodes may send a query response back to the source node. Therefore, a query response may be received from an additional node other than one of the additional nodes that the source node sent the queries to. In one embodiment, receipt of a query response from an additional node indicates that the additional node can communicate with the destination node. If a query response is not received from any of the additional nodes, the method continues to block 450. If a query response is received, the method continues to block 445.

At block 450, processing logic determines whether to query any additional members (nodes) of the gossip communication group. If processing logic determines to query any additional nodes, the method returns to block 415. Otherwise, the method continues to block 470, and processing logic determines that the destination node is unreachable.

At block 445, processing logic determines whether the query response includes an attached message response. In one embodiment, the query response includes an attached message response if the query included an attached message. In another embodiment, the query response includes an attached message response if the query included the attached message and the message response is smaller than a message size threshold. If the query response includes an attached message response, the method continues to block 460, and processing logic detaches the message response from the query response. Otherwise, the method continues to block 455.

At block 455, processing logic sends the initial message to the additional node from which the query response was received. The initial message is sent along with a request to forward the initial message to the destination node. Note that if the initial message was attached to the query at block 435, then block 455 may be skipped. At block 465, a response message is received from the additional node. The message response may have been generated by the destination node, sent to the additional node by the destination node, and forwarded to the source node by the additional node.

Figure 5:
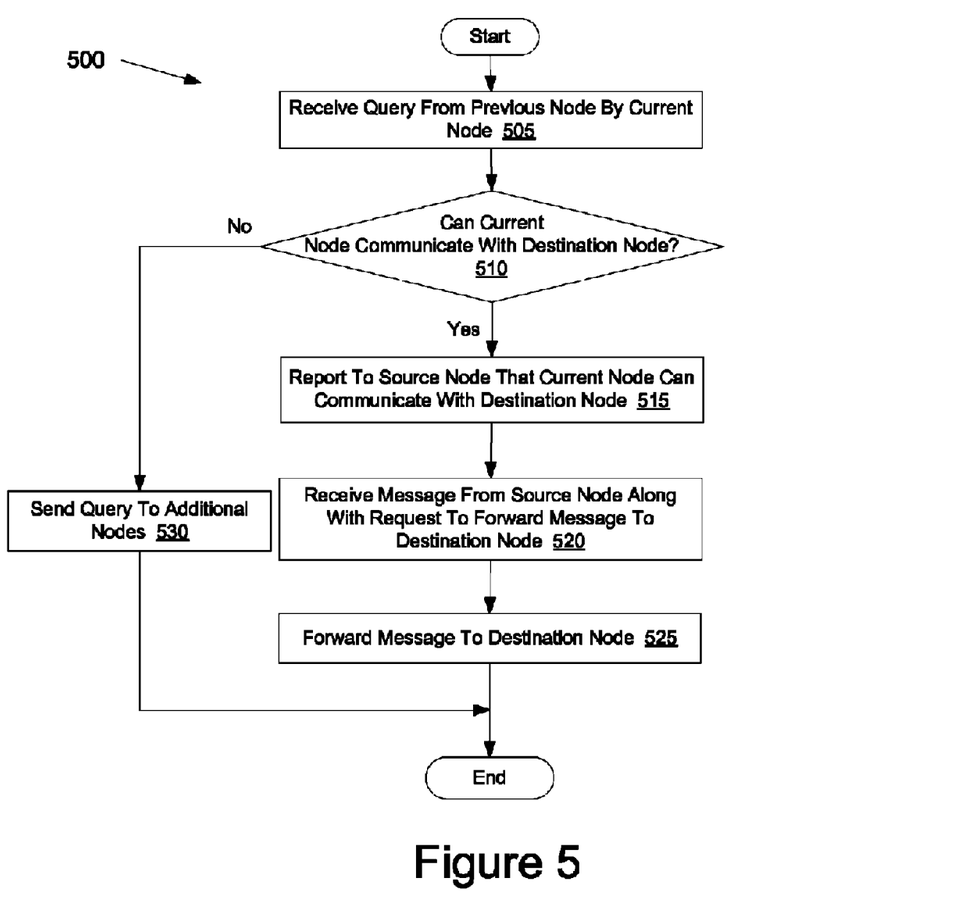
FIG. 5 illustrates a flow diagram of one embodiment for a method of using a gossip protocol to communicate across a network partition by an intermediate node.

FIG. 5 illustrates a flow diagram of one embodiment for a method 500 of using a gossip protocol to communicate across a network partition by an intermediate node. The method may be performed by processing logic that may comprise hardware (e.g., circuitry, dedicated logic, programmable logic, microcode, etc.), software (such as instructions run on a processing device), or a combination thereof. In one embodiment, method 500 is performed by an intermediate machine that includes a gossip enabled communicator 125, as shown in FIG. 1.

Referring to FIG. 5, at block 505 processing receives a query from a previous node by a current node. The previous node may be a source node for a message, or may be an additional node that was queried by the source node or by another additional node. The query asks whether the current node can communicate with a destination node.

At block 510, processing logic determines whether the current node can communicate with the destination node. In one embodiment, processing logic sends a ping message to the destination node and waits for a response. If a response to the ping message is received from the destination node, then the current node can communicate with the destination node. If no ping response is received, then the current node cannot communicate with the destination node. Alternatively, the current node may have recently been in communication with the destination node, and so may not need to send a ping message to the destination node. If the current node can communicate with the destination node, the method proceeds to block 515. Otherwise, the method proceeds to block 530, and processing logic sends (e.g., broadcasts or multicasts) the query to additional nodes.

At block 515, processing logic reports to the source node that the current node can communicate with the destination node. In an alternative embodiment, processing logic sends a query response to the previous node from which the query was received, which forwards the query response on to the source node or to another node. After some number of hops, the query response will be sent back to the source node.

At block 520, processing logic receives a message from the source node along with a request to forward the message to the destination node. Alternatively, processing logic may receive the message from the previous node from which the query was received, which in turn may have received the message from the source node.

At block 525, processing logic forwards the message to the destination node. Processing logic may then receive a message response, and forward the message response back to the source node (or to the previous node).

Figure 6:
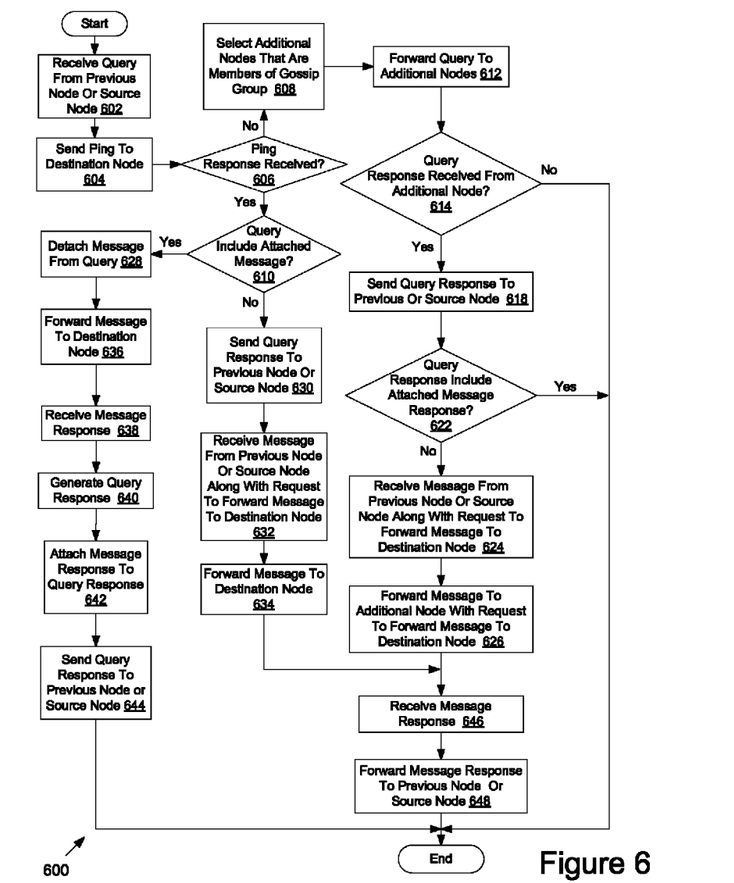
FIG. 6 illustrates a flow diagram of another embodiment for a method of using a gossip protocol to communicate across a network partition by an intermediate node.

FIG. 6 illustrates a flow diagram of another embodiment for a method 600 of using a gossip protocol to communicate across a network partition by an intermediate node. The method may be performed by processing logic that may comprise hardware (e.g., circuitry, dedicated logic, programmable logic, microcode, etc.), software (such as instructions run on a processing device), or a combination thereof. In one embodiment, method 600 is performed by an intermediate machine that includes a gossip enabled communicator 125, as shown in FIG. 1.

Referring to FIG. 6, at block 602 processing receives a query from a previous node or a source node. The previous node may be an additional node that was queried by the source node or by another additional node. The query asks whether the current node can communicate with a destination node.

At block 604, processing logic determines whether the current node can communicate with a destination node. In one embodiment, processing logic sends a ping message to the destination node and waits for a response. At block 606, processing logic determines whether a ping response was received from the destination node. If a response to the ping message is received from the destination node, then the current node can communicate with the destination node, and the method continues to block 610. If no ping response is received, then the current node cannot communicate with the destination node, and the method proceeds to block 608.

At block 610, processing logic determines whether the query includes an attached message. If the query includes an attached message, the method continues to block 628. Otherwise, the method proceeds to block 630.

At block 628, processing logic detaches the message from the query. At block 636, processing logic forwards the message to the destination node. At block 640, processing logic receives a message response from the destination node. At block 642, processing logic attaches the message response to a query response. At block 644, processing logic sends the query response (including the attached message response) to the source node or to the previous node from which the query was received. Alternatively, processing logic may not attach the message response to the query response, and may send the query response and the message response to the source node separately.

At block 630, processing logic sends a query response to the source node. Alternatively, processing logic may send the query response to the previous node from which the query was received. At block 632, processing logic receives a message from the source node (or from the previous node) along with a request to forward the message to the destination node. At block 634, processing logic forwards the message to the destination node.

At block 608, processing logic selects additional nodes that are members of a gossip communication group. At block 612, processing logic forwards the query to each of the selected additional nodes. At block 614, processing logic determines whether any query response has been received from any of the additional nodes. In one embodiment, query responses are sent directly back to the source node, and thus no query responses would be received by the current node. In another embodiment, query responses are sent back to the current node. If no query responses are received, the method ends. If a query response is received from at least one additional node, the method continues to block 618.

At block 618, the current node sends the query response to the previous node. Alternatively, the current node may attempt to send the query response directly to the source node. At block 622, processing logic determines whether the query response includes an attached message response. If the query response includes an attached message response, the message response has already been sent on to the source node or the previous node, and so the method ends. If the query response does not include an attached message response, the method continues to block 624.

At block 624, processing logic receives a message from the previous node or directly from the source node. The message is received along with a request to forward the message to the destination node. At block 626, processing logic forwards the message to the additional node along with the request to forward the message to the destination node. At block 646, a message response is received from the additional node. At block 648, processing logic forwards the message response to the previous node or directly to the source node. The method then ends.

Figure 7A:
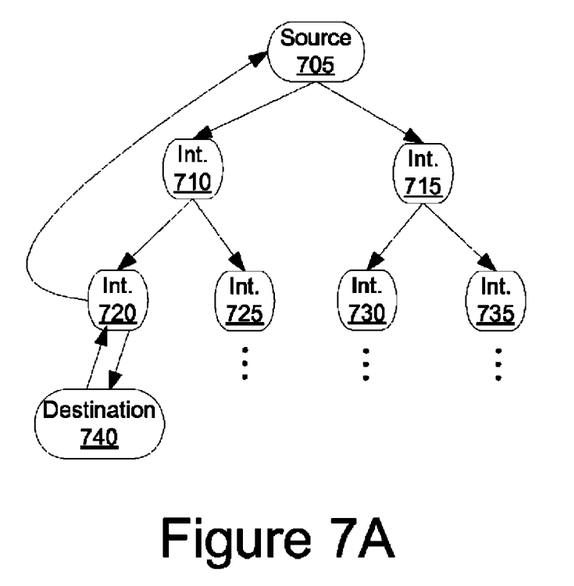
FIG. 7A is a network diagram that shows messages flowing between network nodes, in accordance with one embodiment of the present invention.

FIG. 7A is a network diagram that shows messages flowing between network nodes, in accordance with one embodiment of the present invention. In FIG. 7A, a source node 705 was unable to communicate with a destination node 740, and so sent a query to intermediate nodes 710 and 715. Neither intermediate node 710 nor intermediate node 715 were able to communicate with destination node 740. Therefore, intermediate node 710 forwarded the query to intermediate nodes 720 and 725, and intermediate node 715 forwarded the query to intermediate nodes 730 and 735. None of intermediate nodes 725, 730 or 735 were able to communicate with destination node 740, therefore these nodes forwarded the query on to additional nodes (not shown).

Intermediate node 720 was able to successfully communicate with destination node 740. Additionally, intermediate node 720 can communicate with source node 705. Accordingly, intermediate node 720 reported back to source node 705 that intermediate node 720 can communicate with destination node 740. Intermediate node 720 is therefore set up as a proxy for communications between source node 705 and destination node 740.

Figure 7B:
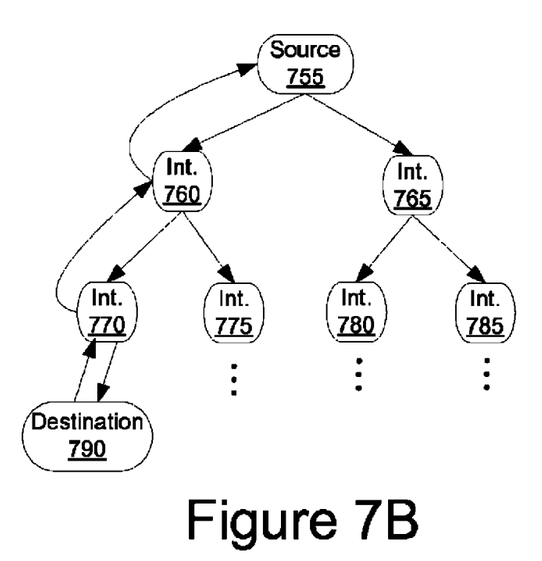
FIG. 7B is a network diagram that shows messages flowing between network nodes, in accordance with another embodiment of the present invention.

FIG. 7B is a network diagram that shows messages flowing between network nodes, in accordance with another embodiment of the present invention. In FIG. 7B, a source node 755 was unable to communicate with a destination node 790, and so sent a query to intermediate nodes 760 and 765. Neither intermediate node 760 nor intermediate node 765 was able to communicate with destination node 790. Therefore, intermediate node 760 forwarded the query to intermediate nodes 770 and 775, and intermediate node 765 forwarded the query to intermediate nodes 780 and 785. None of intermediate nodes 775, 780 or 785 were able to communicate with destination node 790, therefore these nodes forwarded the query on to additional nodes (not shown).

Intermediate node 770 was able to successfully communicate with destination node 790. However, intermediate node 770 cannot communicate with source node 755. Accordingly, intermediate node 770 reported back to intermediate node 760 that intermediate node 770 can communicate with destination node 790. Intermediate node 760 then reports back to source node 755 that intermediate node 760 can communicate with destination node 790. Intermediate node 760 is therefore set up as a proxy for communications between source node 755 and intermediate node 770. Intermediate node 770 is in turn set up as a proxy for communications between intermediate node 760 and destination node 790. Accordingly, in embodiments of the present invention, if there is some route by which a source node can communicate with a destination node, that route will be discovered and utilized to enable communication between the source node and the destination node.

Figure 8:
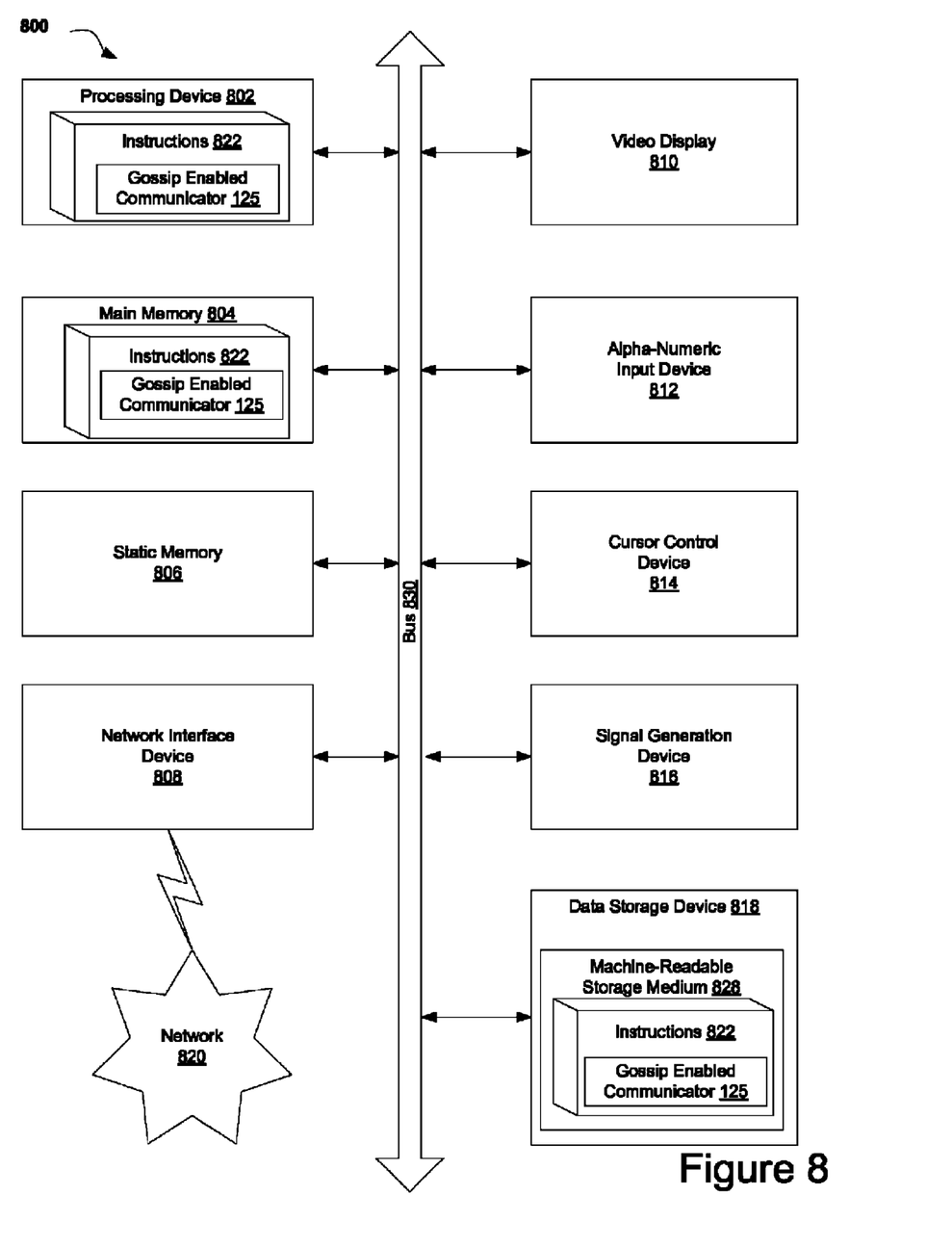
FIG. 8 illustrates a block diagram of an exemplary computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one embodiment, the instructions 822 include instructions for a gossip enabled communicator (e.g., gossip enabled communicator 205 of FIG. 2) and/or a software library containing methods that call a gossip enabled communicator. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for using a gossip communication protocol to communicate across a network partition are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "sending" or "performing" or "causing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   sending a message to a destination node;
   using, by a processing device, a gossip communication protocol to discover an additional node that is able to communicate with the destination node in view of failing to receive a message response from the destination node, wherein the additional node is discovered by:
      sending a query to a plurality of additional nodes, wherein the query causes the plurality of additional nodes to attempt to communicate with the destination node and to forward the query to other additional nodes upon failure of the attempt to communicate with the destination node;
      determining that the message is smaller than a message size threshold;
      attaching the message to the query in view of determining that the message is smaller than the message size threshold, wherein the additional node forwards the message to the destination node upon receiving the query; and
      receiving a query response from the additional node from among the other additional nodes, wherein the query response indicates that the additional node is able to communicate with the destination node; and
   using the additional node as a proxy for communicating with the destination node.

2. The method of claim 1, wherein the query response comprises an attached message response that was generated by the destination node and sent to the additional node in view of the destination node processing the message.

3. The method of claim 1, wherein each of the plurality of additional nodes, each of the other additional nodes, and the processing device are members of a gossip communication group.

4. A method comprising:
   receiving a query from a source node via a gossip communication protocol, wherein the query asks whether a processing device is able to communicate with a destination node;
   determining that the processing device is able to communicate with the destination node; and
   performing the following by the processing device in view of determining that the processing device is able to communicate with the destination node:
      reporting to the source node that the processing device is able to communicate with the destination node;
      receiving a message from the source node along with a request to forward the message to the destination node, wherein the message and the request to forward the message are received as attachments to the query in view of a determination that the message is smaller than a message size threshold; and
      forwarding the message to the destination node; and
   determining that the processing device is not able to communicate with the destination node; and
   sending the query to other additional nodes in view of determining that the processing device is not able to communicate with the destination node, wherein the query causes the other additional nodes to attempt to communicate with the destination node.

5. The method of claim 4, further comprising:
   receiving a message response from the destination node; and forwarding the message response to the source node.

6. The method of claim 4, wherein the processing device, the source node, and each of the other additional nodes are members of a gossip communication group.

7. A non-transitory computer readable medium including instructions that, when executed by a processing device, cause the processing device to perform operations comprising:
sending a message to a destination node;
using, by the processing device, a gossip communication protocol to discover an additional node that is able to communicate with the destination node in view of failing to receive a message response from the destination node, wherein the additional node is discovered by:
sending a query to a plurality of additional nodes, wherein the query causes the plurality of additional nodes to attempt to communicate with the destination node and to forward the query to other additional nodes upon failure of the attempt to communicate with the destination node;
determining that the message is smaller than a message size threshold;
attaching the message to the query in view of determining that the message is smaller than the message size threshold, wherein the additional node forwards the message to the destination node upon receiving the query; and
receiving a query response from the additional node from among the other additional nodes, wherein the query response indicates that the additional node is able to communicate with the destination node; and
using the additional node as a proxy for communicating with the destination node.

8. The non-transitory computer readable medium of claim 7, wherein the query response comprises an attached message response that was generated by the destination node and sent to the additional node in view of the destination node processing the message.

9. The non-transitory computer readable medium of claim 7, wherein each of the plurality of additional nodes, each of the other additional nodes, and the processing device are members of a gossip communication group.

10. A non-transitory computer readable medium including instructions that, when executed by a processing device, cause the processing device to perform operations comprising:
receiving a query from a source node via a gossip communication protocol, wherein the query asks whether the processing device is able to communicate with a destination node;
determining, that the processing device is able to communicate with the destination node; and
performing the following by the processing device in view of determining that the processing device is able to communicate with the destination node:
reporting to the source node that the processing device is able to communicate with the destination node;
receiving a message from the source node along with a request to forward the message to the destination node, wherein the message and the request to forward the message are received as attachments to the query in view of a determination that the message is smaller than a message size threshold; and
forwarding the message to the destination node; and
determining that the processing device is not able to communicate with the destination node; and sending the query to other additional nodes in view of determining that the processing device is not able to communicate with the destination node, wherein the query causes the other additional nodes to attempt to communicate with the destination node.

11. The non-transitory computer readable medium of claim 10, the operations further comprising:
receiving a message response from the destination node; and
forwarding the message response to the source node.

12. The non-transitory computer readable medium of claim 10, wherein the processing device, the source node, and each of the other additional nodes are members of a gossip communication group.

13. A system comprising:
a source computing device having a first memory to store first instructions for a gossip enabled communicator and a first processing device, coupled to the first memory, to execute the first instructions, wherein the first instructions cause the first processing device to:
send a message to a destination node;
use a gossip communication protocol to discover an additional node that is able to communicate with the destination node in view of failing to receive a message response from the destination node, wherein to discover the additional node the processing device:
sends a query to a plurality of additional nodes, wherein the query causes the plurality of additional nodes to attempt to communicate with the destination node and to forward the query to other additional nodes upon failure of the attempt to communicate with the destination node;
determines that the message is smaller than a message size threshold;
attaches the message to the query in view of the determination that the message is smaller than the message size threshold, wherein the additional node forwards the message to the destination node upon receiving the query; and
receives a query response from the additional node from among the other additional nodes, wherein the query response indicates that the additional node is able to communicate with the destination node; and
use the additional node as a proxy for communicating with the destination node.

14. The system of claim 13, further comprising:
an intermediate computing device that comprises the additional node, the intermediate computing device having a second memory for storing second instructions for an additional gossip enabled communicator and a second processing device to execute the second instructions, wherein the second instructions cause the second processing device to:
receive the query from the source computing device via the gossip communication protocol, wherein the query asks whether the intermediate computing device is able to communicate with the destination node;
determine that the intermediate computing device is able to communicate with the destination node; and
perform the following in view of the determination that the intermediate computing device is able to communicate with the destination node:
report to the source computing device that the intermediate computing device is able to communicate with the destination node;

receive the message from the source computing device along with a request to forward the message to the destination node, wherein the message and the request to forward the message are received as attachments to the query in view of the determination that the message is smaller than the message size threshold; and forward the message to the destination node.

15. The system of claim 14, wherein the second instructions further cause the second processing device to:

receive a message response from the destination node; and forward the message response to the source computing device.

16. The system of claim 14, wherein the second instructions further cause the second processing device to:

determine that the intermediate computing device is not able to communicate with the destination node; and send the query to the other additional nodes in view of the determination that the intermediate computing device is not able to communicate with the destination node, wherein the query causes the other additional nodes to attempt to communicate with the destination node.

17. The system of claim 14, wherein the intermediate computing device, the source computing device, each of the plurality of additional nodes, and each of the other additional nodes are members of a gossip communication group.

* * * * *